United States Patent
Ezra et al.

(10) Patent No.: US 6,941,492 B1
(45) Date of Patent: Sep. 6, 2005

(54) DEBUGGING TOOL FOR EFFICIENT SWITCHING BETWEEN TARGETS IN A MULTI-PROCESSOR ENVIRONMENT

(75) Inventors: Josef Ezra, Ashland, MA (US); Eli Shagam, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 561 days.

(21) Appl. No.: 10/068,079

(22) Filed: Feb. 5, 2002

(51) Int. Cl.[7] .............................................. G06F 11/00

(52) U.S. Cl. ........................... 714/38; 714/27; 714/45; 714/46; 717/124; 717/128; 717/129; 717/131

(58) Field of Search .......................... 714/25, 27, 30, 714/38, 45–48, 53, 57; 717/124, 128, 129, 717/131

(56) References Cited

U.S. PATENT DOCUMENTS

| | | | |
|---|---|---|---|
| 5,325,530 A * | 6/1994 | Mohrmann | 717/124 |
| 6,158,045 A * | 12/2000 | You | 717/124 |
| 6,161,216 A | 12/2000 | Shagam | |
| 6,275,956 B1 * | 8/2001 | On et al. | 717/125 |
| 6,311,326 B1 | 10/2001 | Shagam | |
| 6,324,683 B1 * | 11/2001 | Fuh et al. | 717/124 |
| 6,754,891 B1 * | 6/2004 | Snyder et al. | 717/128 |
| 6,804,813 B1 * | 10/2004 | Willems et al. | 717/125 |
| 2002/0100024 A1 * | 7/2002 | Hunter et al. | 717/129 |

* cited by examiner

Primary Examiner—Robert Beausoliel
Assistant Examiner—Michael Maskulinski
(74) Attorney, Agent, or Firm—Daly, Crowley, Mofford & Durkee, LLP

(57) ABSTRACT

A debugger mechanism to support multiple active targets and efficient switching between multiple active targets, in particular, heterogeneous targets, in a multiprocessing environment.

9 Claims, 5 Drawing Sheets

DEBUGGING TOOL FOR EFFICIENT SWITCHING BETWEEN TARGETS IN A MULTI-PROCESSOR ENVIRONMENT

BACKGROUND

The invention relates generally to software debugging tools.

The GNU debugger (commonly referred to as "GDB") is a software debugger that allows a user to debug programs remotely in a setup where the platform running GDB itself (the debugger system) is connected to the platform running the application being debugged (the target) via a serial port, network connection or some other means.

When debugging a remote target, GDB depends on the functionality provided by a debugging stub, a small piece of code that serves as the intermediary between the debugger system and the application or code being debugged. In conventional GDB implementations, GDB and the debugging stub communicate via a message-based protocol that contains commands to read and write memory, query registers, run the program and so forth. To set breakpoints, GDB uses read and write commands to replace an application instruction with an opcode that causes control to transfer to the debugging stub when that instruction is encountered. The debugging stub communicates the event to GDB and awaits further instruction from GDB. In a typical GDB session, when the debugging stub informs GDB when a breakpoint is encountered, GDB displays the appropriate code to the user, allowing the user to observe certain variables and the behavior of the program at the breakpoint.

GDB also provides tracepoints, which allow a user or software developer to record information about a running program with minimal interruption of the program. Tracepoints require additional debugging stub support to implement, but are handled in a manner similar to breakpoints.

For multiple active targets (for example, debugging of code on multiple CPUs in a multi-processing target environment), conventional GDB debugging solutions provide for debugging one target at a time, and maintain and use separate symbol tables for each of the targets. Such solutions therefore require significant memory capacity to support multiple sessions, that is, one session per target, and tend to incur high target switching latency as well due to the processing overhead associated with switching between different targets.

SUMMARY

In one aspect, debugging code includes selecting targets running on different processors at a target site, associating each target with a session and the session with a symbol table, and using the session to direct debugger information to the target with which the session is associated.

In another aspect, remotely debugging code which runs at a target site located remotely from a debugger site includes using a single user interface coupled to a debugger tool at the debugger site to select at least two targets running on separate processors at the target site, associating each target with a session to the debugger tool, the session being associating with a symbol table, and using the session to direct debugger information to the target with which the session is associated.

Particular implementations of the invention may provide one or more of the following advantages.

The present invention provides a mechanism that allows the same interface to be used to control multiple debug sessions, and also allows the same session to be used to support more than one target, that is, targets that have a common symbol table. Thus, the debugger does not need to maintain separate symbol tables and establish separate sessions for targets that have the same symbol table. These optimizations enable more efficient switching between multiple active heterogeneous targets, as well as reduce the amount of memory and processing overhead associated with the use of symbol tables by a debugger tool that handles debug sessions with multiple active targets.

Other features and advantages of the invention will be apparent from the following detailed description and from the claims.

DESCRIPTION OF DRAWINGS

Like reference numbers will be used to represent like elements.

DETAILED DESCRIPTION

Figure 1:
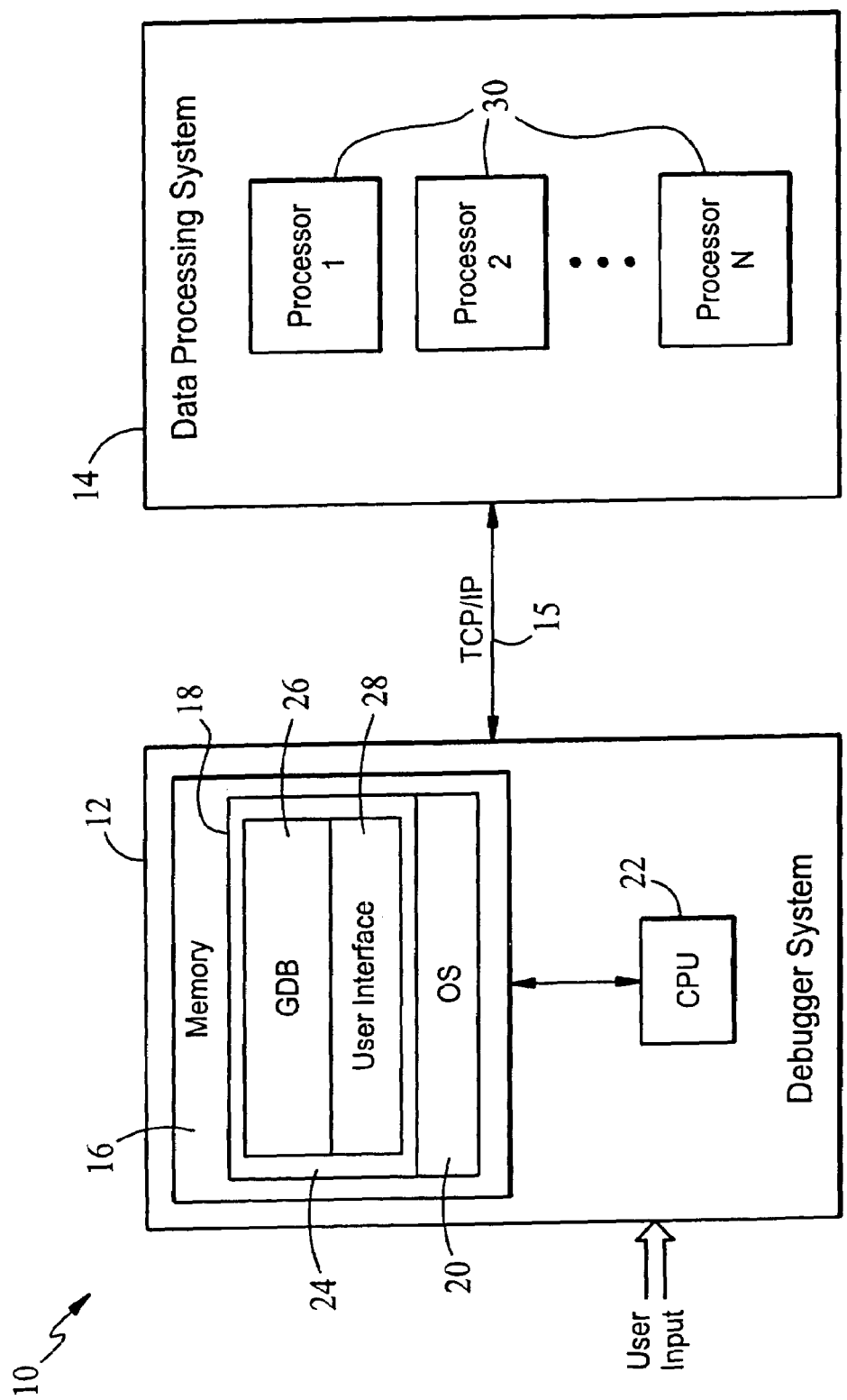
FIG. 1 is a block diagram depicting a multi-processing, remote debugging environment.

FIG. 1 shows a remote program debugging environment 10. Included is a debugger system 12 coupled to a data processing system 14 that executes application code to be debugged (target code) via an interconnection 15. The interconnection 15 may be implemented as a serial bus, or a TCP/IP connection (over a network, for example, the Internet) for remote debugging sessions. The debugger system 12 includes a memory 16 for storing upper-level software 18 and lower-level software 20, such as an Operating System (OS), as shown. The system 12 further includes a CPU 22 that executes the software 18 and 20. The upper level software includes a debugger package 24 that includes a debugger application, such as GDB 26 (as shown), and a debugger front end shown as a User Interface 28. Preferably, although not shown, the debugger system 12 further includes any hardware and additional software to support all logic needed to control and display the state of a debug session, communicate with the target environment 14 (using whatever interconnection 15 is selected), as well as support I/O interactions with a user of the system 12. Also, it will be understood that the debugger system 12 maintains in memory 16 any source and binary files, as well as corresponding symbol table, for code to be debugged.

The data processing system 14 is a multi-processor system. In one embodiment, the data processing system 14 includes a plurality of processors 30, shown as processors 1 through N, where N is the total number of processors available in the system. The processors 30 can be implemented as or reside on different computer systems, or, alternatively, can be different devices on a single system. Two or more of the processors may run the same program, as will be discussed further.

Figure 2:
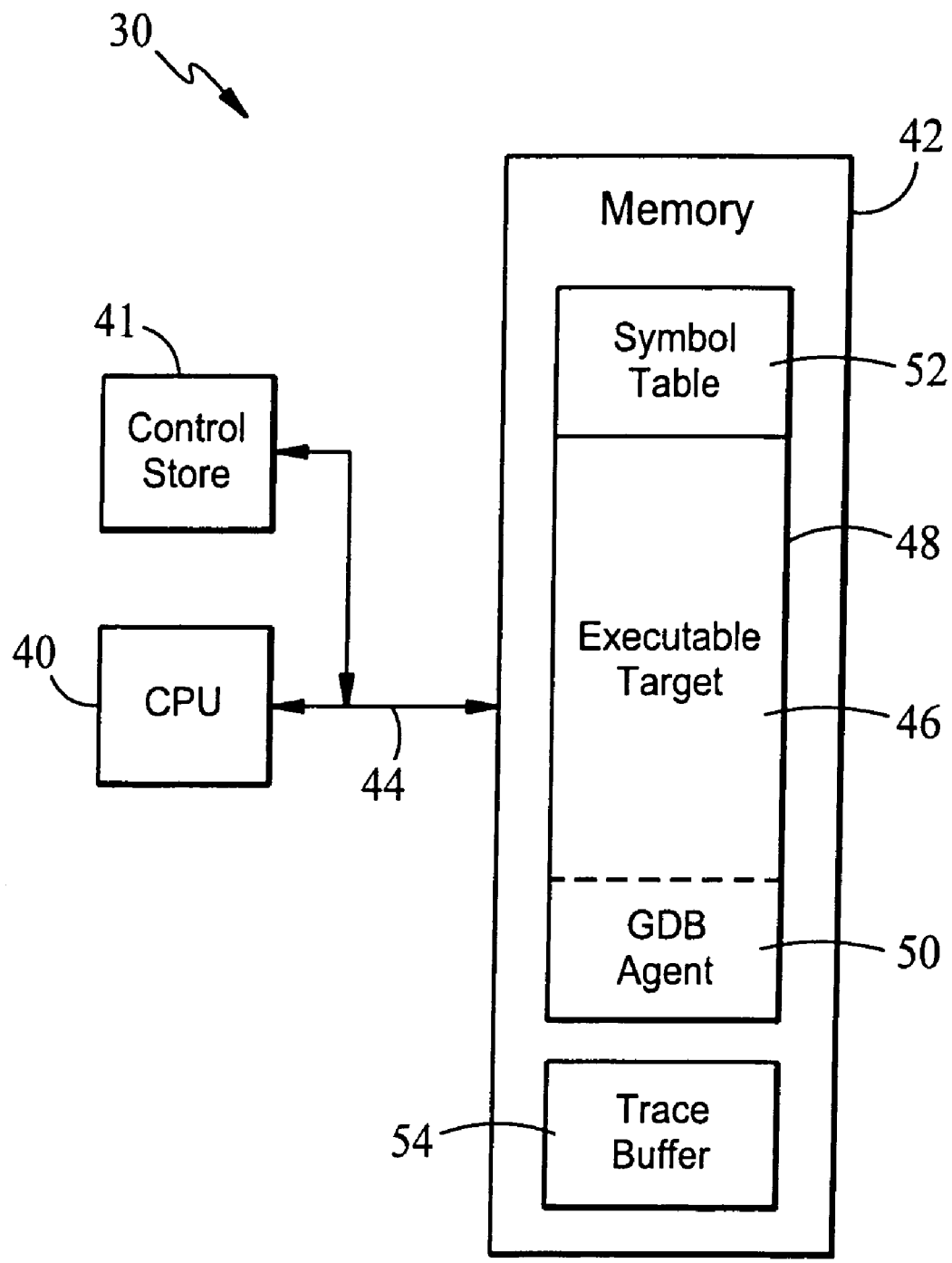
FIG. 2 is a block diagram of a single processor (within the multiprocessing environment of FIG. 1) that stores and executes code to be debugged.

In one exemplary embodiment, and as shown in FIG. 2, each of the processors 30 includes a CPU 40 coupled to a control store 41 and a local, nonvolatile memory (NVM) 42 by an internal bus 44. The CPU 40 controls the overall operations of the processor 30 and communications with the memories 41 and 42. The local memory 42 stores executable code ("target") 46, which includes a binary file (.BIN file) that may be the target of a debug session ("executable target") 48 and a GDB agent or stub 50 that communicates with the GDB 26 (FIG. 1) during a debug session. The code 46 is read each time the data processing system 14 is initialized. The code 48, which defines the functionality and operation of the processor 30, and the GDB stub 26 are copied into the control store 41 at initialization for subsequent execution by the CPU 40. The stub 50 is provided with GDB to implement the target side of the communication protocol, and the GDB side is implemented in the GDB 26. The GDB stub file is compiled and linked together with the binary code 48. The memory 42 also stores a symbol table 52 associated with the code 48. A copy of the symbol table 52 is maintained by the GDB 26 and used during a debug session. Further included in the memory 42 is a buffer 54 (shown as a trace buffer), which can be used by the stub 50 to store collected trace and other debug information.

Returning to FIG. 1, prior to commencing a debug session on a target, the debugger system 12 establishes a connection between the debugger system 16 and the target system 42. Once the connection has been established, and when a user is running GDB on a physically separate system, or controlling a standalone system over a serial port or a real-time system over a TCP/IP connection, as shown in FIG. 1, the user can begin remote debugging. Once sessions have been set up, switching between targets can be performed very quickly, and with a much lower burden on the system 12 because the debugger 26 does not need to maintain and use multiple symbol tables for targets running the same code, as will be discussed in further detail below.

Typcially, to begin remote debugging, the user runs GDB 26 on the system 12, and specifies as an executable file a program that is running in a remote machine. This information tells the GDB 26 how to locate the appropriate symbol table for that program. Typically, and as mentioned above, the symbol table is stored on the debugger system 12. The GDB 26 also specifies how to communicate with the target—either via a devicename attached to a direct serial line, or a TCP port. Type or protocol of a target machine, as well as parameters like device names or host names to connect with, process numbers, baud rates, and so forth, may also be specified. In alternative implementations, where a copy of the symbol table does not already reside on the GDB 26, GDB commands allow the user to record a copy of the filename symbol table 52 in GDB 26.

During a debugging cycle in which trace points are used, the user selects trace points in the target program's code at which the GDB 26 should collect data. The user specifies expressions to evaluate at each trace point. These expressions may denote objects in memory, in which case those objects' contents are recorded as the program runs, or computed values, in which case the values themselves are recorded. GDB transmits the tracepoints and their associated expressions to the GDB agent 50 (shown in FIG. 2) running on the selected debugging target. When execution on the target reaches a trace point, the agent 50 evaluates the expressions associated with that trace point, and records the resulting values and memory ranges in the trace buffer 54. Later, when the user selects a given trace event and wishes to inspect the objects and expression values recorded, the GDB 26 interacts with the GDB agent 50 to retrieve data recorded in the trace buffer 54 as necessary to meet the user's requests. Other details about using trace points and generating debug scripts can be had with reference to U.S. Pat. Nos. 6,311,326 and 6,161,216, incorporated herein by reference, as well as other references.

In a multiprocessor system such as system 14, a user may wish to monitor an area of code executing on the different processors 30. To provide for multiple active targets with the same user interface while minimizing the number of different symbol tables that must be maintained and handled by the GDB 26 during debug, the GDB 26 is optimized to support multiple GDB sessions between the same user interface and the multiprocessor system, and further allows for a given GDB session to support multiple targets that share common code (and therefore a common symbol table), for efficient switching between active targets.

Figure 3:
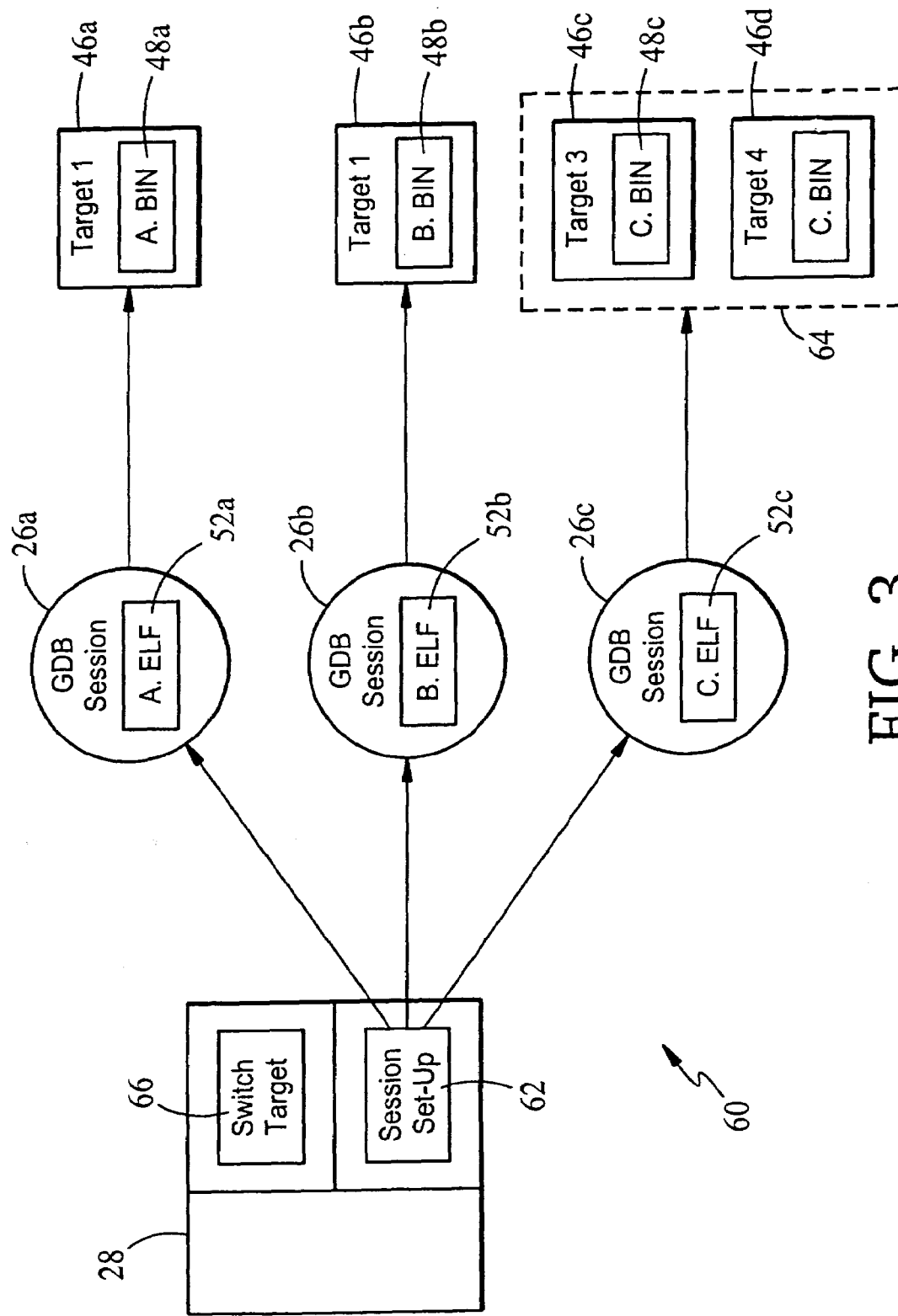
FIG. 3 is block diagram depicting a multi-session environment for remote debug activity involving multiple active, heterogeneous targets and a single user interface.

Referring to FIG. 3, a multi-session environment 60 in which GDB optimized for a multiprocessor system and target switching between targets on different processors in a multiprocessor configuration is shown. In an exemplary implementation, there are four targets 46a through 46d, each corresponding to a different one of the processors 30 (shown in FIG. 1). Each target includes a binary file. More specifically, target 46a includes binary file "A.BIN" 48a, target 46b includes binary file "B.BIN" 48b and targets 46c and 46d include copies of "C.BIN" 48c. Thus, it can be seen that targets 46c and 46d, collectively identified by reference numeral 64, run the same code. The user interface 28 includes a session setup component 62 that sets up a different GDB session for each group of one or more targets that uses a different symbol table. Thus, for the exemplary configuration shown in FIG. 3, the component 62 creates a first GDB session 26a for a first target, target 46a, a second GDB session 26b for a second target, target 46b, and a third GDB session 26c for targets 46c and 46d that run the same code and therefore have a common symbol table. Each session uses a different symbol table, the symbol table that corresponds to the binary code of the target or target group with which that session is associated. In the example shown, therefore, the session 26a maintains and uses a first symbol table "A.ELF" 52a which corresponds to the binary file "A.BIN" 48a of target 46a. Likewise, the session 26b maintains and uses a second symbol table "B.ELF" which corresponds to the binary file "B.BIN" 48b of target 46b. The third session 26c maintains and uses a third symbol table "C.ELF" which corresponds to the binary file "C.BIN" 48c of the target group 64 (that is, targets 46c and 46d). Thus, the creation of debug session provides for a one-to-one correspondence between symbol tables and associated binary files (e.g., A.ELF and A.BIN). For a given debug command (e.g., set tracepoint in line 22 of source file 'xx.c', or show var 'y' in source file 'xx.c'), a session uses its symbol table to determine the correct address in the target code.

In one implementation, the GDB sessions 26a, 26b, 26c can create (or open) file handles to enable communications with the targets. The file handles correspond to pipes that are used to pass target information (e.g., trace point information) from the GDB interfaces 26a, 26b, 26c to lower level processes, such as TCP/IP daemons, that are transmitting GDB commands and responses (or debugger packets) between the systems 12 and 14. That is, for a given target, the appropriate pipe is written to by the GDB session supporting that target and is read by a TCP/IP daemon (supporting the TCP/IP connection to that target's machine). The TCP/IP daemon forwards the information read from the pipe in a data transmission to the target, where it is handled by the GDB agent 50 (FIG. 2) in conjunction with other supporting routines in the executable code itself to perform a debugging related operation. Once a session has been established for multiple targets (e.g., session 26c), the user can switch between the targets using a switch target option 66 to invoke the appropriate GDB interface. Thus, it will be appreciated that the arrival of debug information at the different targets (and thus the response by the debugger stubs on the targets) can occur almost concurrently.

Figure 4:
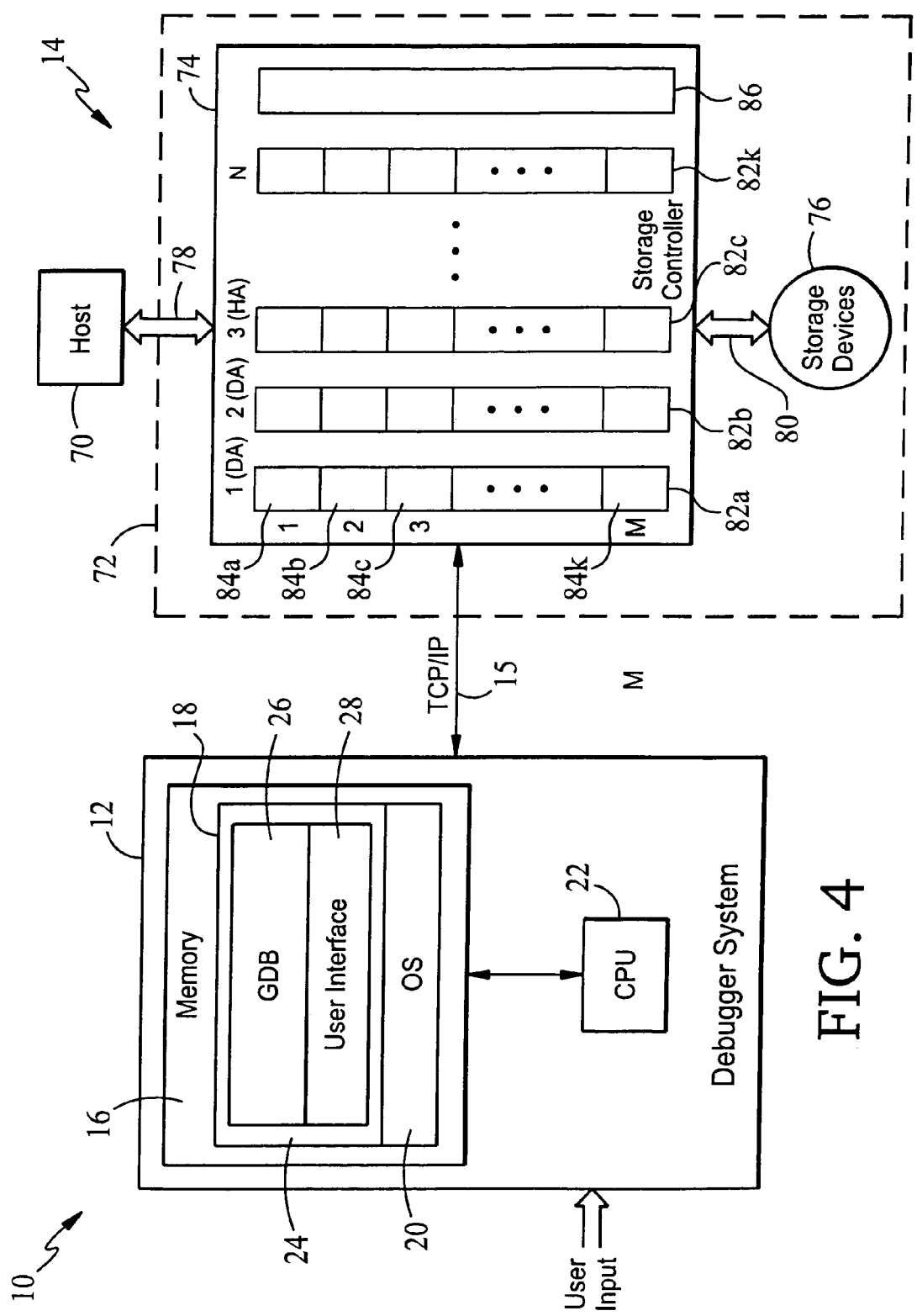
FIG. 4 is a block diagram depicting another embodiment of the multi-processing, remote debugging environment that includes a multi-processor data storage controller.

In another embodiment, as shown in FIG. 4, the data processing system 14 includes at least one host system 70 connected to a data storage system 72. The data storage system 72 receives data and commands from, and delivers data and responses to, the host computer 70. The data storage system 72 is a mass storage system having a controller 74 coupled to pluralities of physical storage devices 76 such as disk devices, as well as the host system 70. The data storage system 72 can be, for example, that made by EMC and known as the Symmetrix data storage system.

The controller 74 receives memory write commands from the various host system a bus 78, for example, connected and operated in accordance with a SCSI protocol, and delivers the data associated with those commands to the appropriate ones of devices 76, over respective connecting buses, shown collectively as a bus 80. The bus 80 also operates in accordance with a SCSI protocol. Other protocols, for example, Fibre Channel, could also be used for buses 78, 80. The controller 74 also receives read requests from the host system 70 over the bus 78, and delivers requested data to the host system 70, either from a cache memory of the controller 74 or, if the data is not available in cache memory, from the disk devices 76.

Optionally, the controller 74 may be connected to another data processing system like the data processing system 14 or data storage system like the data storage system 72 for data back-up capability by a data link (not shown). Such a data link enables a remotely located data storage system to store on its own devices a copy of information stored in the devices 76 of the data storage system 72 in a mirrored manner.

Still referring to FIG. 1, and using the controller of the EMC Symmetrix data storage system as an illustrative example, some details of the internal architecture of the data storage system 14 are shown. The controller 74 includes "N" bus slots to receive adapters (or directors) 82, shown as adapters 82a, 82b, 82c, . . . 82k, with the designator 82k corresponding to the "Nth" adapter. Each of the adapters 42 includes one or more processors 84, shown as processors 84a, 84b, 84c, . . . , 84k, with the designator 84k corresponding to the "Mth" processor. The controller 74 also includes at least one memory module 76. The values of M and N, corresponding to the number of processors per adapter and adapters, respectively, are of course a function of system design and customer requirements.

In operation, the host system 70 sends, as required by the application it is running, commands to the data storage system 72 requesting data stored in the logical volumes or providing data to be written to the logical volumes. The communications from the host system 70 typically connect the host system 70 to a port of one of the directors 82 implemented as a host adapter (or "HA"), indicated as the adapter 82c, over the SCSI bus 78. The host director, in turn, connects over one or more system buses (not shown) to a memory 86 ("referred to as a "global memory"). The global memory 86 is preferably a large memory through which the host director can communicate with the disk devices 76. Typically, the global memory includes a common area for supporting communications between the host system 70 and the disk devices 76, a cache memory for storing data and control data structures, and tables for mapping areas of the disk devices 76 to areas in the cache memory.

One or more of the adapters are implemented as disk adapters ("DA"), for example, 82a and 82b, as shown. The disk adapters 82a–82b, which are also connected to the global memory 86, control the disk devices 76.

Like the host director 82c, the disk adapters 82a–82b are also connected to the global memory 76 via one of the internal controller system buses. During a write operation, the disk adapters read data stored in the global memory 86 by a host director 82c and write that data to the logical volumes for which they are responsible. During a read operation and in response to a read command, the disk adapters 82a–82b read data from a logical volume and write that data to global memory for later delivery by the host adapter 82c to the requesting host system 70.

Although not shown, at least one of the adapters 82 could be implemented as a remote adapter to support remote data back-up activity. Thus, each data storage system 14 in the mirrored storage configuration would include a remote adapter to connect to a data link connecting the two systems and handle transfers of data over that link. The remote adapter would also communicates with the global memory 86 over one of the internal system buses (not shown).

Internally, each of the processors 84 may be implemented as that illustrated in FIG. 2. In the embodiment of FIG. 4, however, the components of the microcode 48 can include the following: a system calls/host application layer; advanced functionality modules, which may be optional at the adapter level or even at the data storage subsystem level; common function modules, which are provided to each adapter; one of interface (or I/O control interface) modules; and one or more physical transport (or device) drivers. Interface modules exist for each of the different types of adapters that are available based on connectivity and/or function. The modules can include a number of different interfaces, such as a Remote Data Facility (RDF) interface to define the functionality of a remote adapter, mainframe and Open Systems host interfaces to define host directors such as HA 82c, and a back-end interface to define the functionality of the back-end adapter, such as disk adapters 82a and 82b. For example, an adapter that has been loaded with the disk adapter or interface code is thus programmed to serve as the disk adapter or one of the disk adapters (when more than one is present in the system). As such, it is responsible for controlling back-end operations of the controller 74. These operations include services for read misses, write destaging, read prefetching, RAID, data copy, as well as other background drive operations. The physical transport drivers can include, but need not be limited to, a Fibre Channel transport, a SCSI transport and a Gigabit Ethernet transport.

Figure 5:
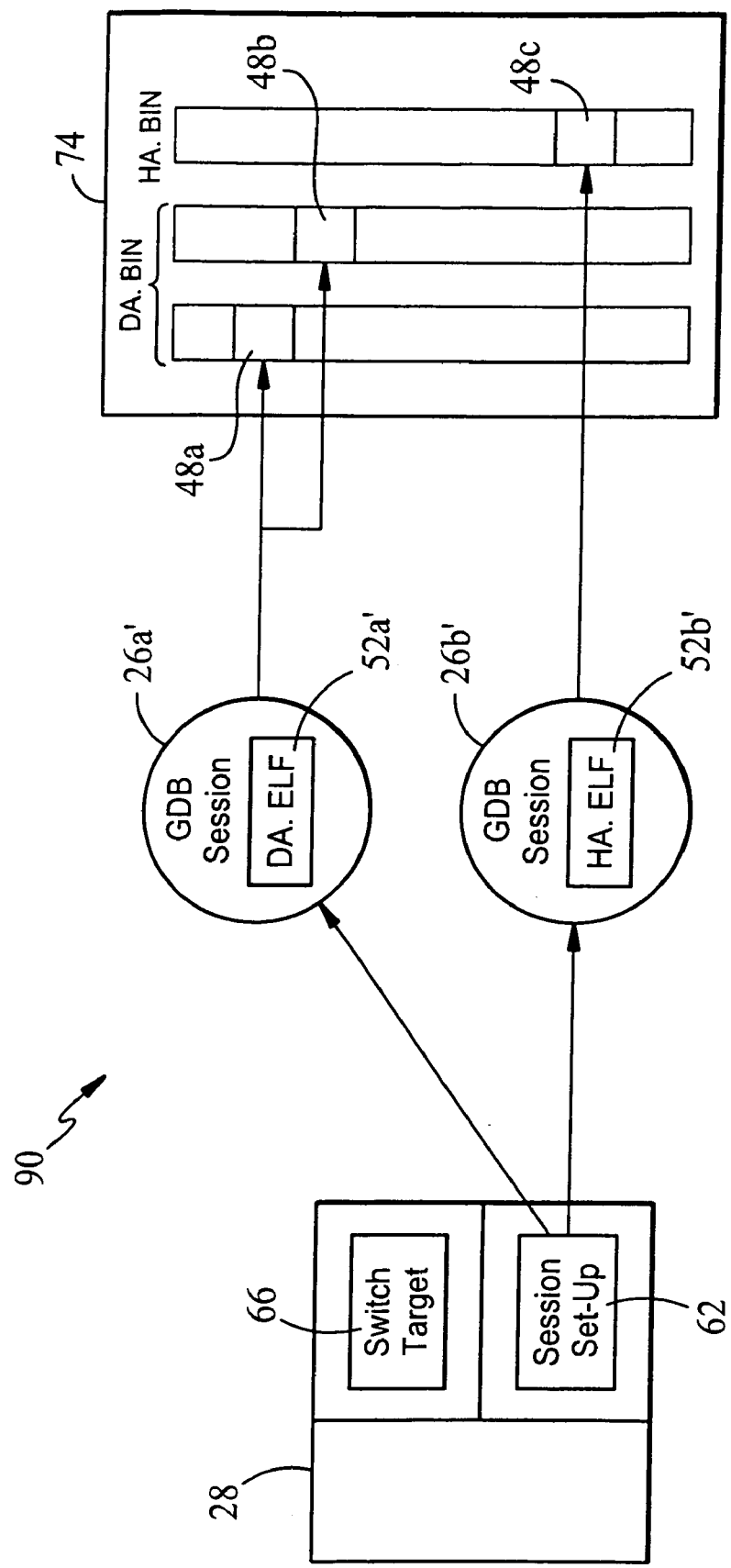
FIG. 5 is block diagram depicting a multi-session environment for remote debug activity involving a single interface and multiple active, heterogeneous targets of the storage controller shown in FIG. 4.

FIG. 6 is similar to FIG. 3, but illustrates a multi-session environment 90 that includes the controller 74 of FIG. 5. The example shown in FIG. 6 shows three targets, a first target 48a' on adapter 82a, a second target 48b' on the adapter 82b and a third target 48c' on adapter 82c. The processors 84 on the adapters 82a and 82b execute copies of the same code (DA.BIN), while the processors 84 on the adapter 82c execute a different code (HA.BIN). Thus, the component 62 sets up two sessions, a first session 26a' to support debug communications with targets 48a' and 48b', and a second session 26b' to support the same type of interaction with the target 48c'. Accordingly, therefore, session 26a' maintains and uses a copy of a symbol table "DA.ELF" that corresponds to the files "DA.BIN" resident on the processors 84 of the adapters 82a and 82b, while session 26b' maintains and uses a copy of a symbol table "HA.ELF" that corresponds to the files "HA.BIN" resident on the processors 84 in the adapter 82c. While only one target on each adapter is shown, it will be appreciated that each session can support multiple targets on the same adapter as well, that is, send the same debug information to multiple processors 84 on the same adapter, as each of the processors 84 on the adapter executes the same code.

Other details of the Symmetrix architecture not described above may be had with reference to commercially available product literature from EMC Corporation, as well as U.S. Pat. Nos. 5,206,939 and 5,742,792, incorporated herein by reference. Likewise, additional details of GDB and the GDB protocol may be had with reference to documentation available from Red Hat, as well as other sources that distribute such information via the World Wide Web.

It will be appreciated that the techniques described herein can be extended to other types of debugging operations, such as code fix operations, as well.

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A method of debugging code, comprising:
   selecting targets running on different processors at a target site;
   associating each target with a session and the session with a symbol table; and
   using the session to direct debugger information to the target with which the session is associated, wherein the session is the same session for at least two of the targets.

2. The method of claim 1, wherein associating comprises determining that executable binary code of the at least two targets have the same symbol table.

3. The method of claim 1, wherein the session is different for each of the targets.

4. The method of claim 3, wherein associating comprises determining that the executable binary codes of the targets each have a different symbol table.

5. The method of claim 1, wherein the session uses the symbol table with which it is associated to determine an address to be associated with the debugger information, the symbol table corresponding to the executable binary code on at least one of the targets.

6. The method of claim 1, wherein the session uses the symbol table with which it is associated to determine an address to be associated with the debugger information, the symbol table corresponding to the executable binary code on more than one of the targets.

7. The method of claim 1, wherein the targets correspond to executable binary code that executes on a storage controller of a data storage system.

8. The method of claim 7, where the session uses the symbol table with which it is associated to determine an address to be associated with the debugger information, the symbol table corresponding to the executable binary code of more than one of the targets.

9. The method of claim 7, wherein the storage controller includes adapters for controlling communications with resources connected to the storage controller and wherein the at least two targets correspond to executable binary code that executes on the adapters.

* * * * *

UNITED STATES PATENT AND TRADEMARK OFFICE
CERTIFICATE OF CORRECTION

PATENT NO. : 6,941,492 B1
DATED : September 6, 2005
INVENTOR(S) : Josef Ezra et al.

It is certified that error appears in the above-identified patent and that said Letters Patent is hereby corrected as shown below:

Column 1,
Line 61, "associating" should read -- associated --.

Column 5,
Line 25, "various host system a bus 78," should read -- host system via a bus 78, --.

Column 6,
Line 1, "("referred to as a "global memory")." should read -- (referred to as a "global memory"). --.
Line 29, "also communicates" should read -- also communicate --.

Signed and Sealed this

Twenty-eighth Day of February, 2006

JON W. DUDAS
*Director of the United States Patent and Trademark Office*